US010483513B2

(12) United States Patent
Weber et al.

(10) Patent No.: US 10,483,513 B2
(45) Date of Patent: Nov. 19, 2019

(54) ASYMMETRICAL SEPARATOR

(75) Inventors: Christoph Weber, Laudenbach (DE); Michael Roth, Mainz (DE)

(73) Assignee: CARL FREUDENBERG KG, Weinheim (DE)

( * ) Notice: Subject to any disclaimer, the term of this patent is extended or adjusted under 35 U.S.C. 154(b) by 704 days.

(21) Appl. No.: 13/263,993

(22) PCT Filed: Mar. 29, 2010

(86) PCT No.: PCT/EP2010/001979
§ 371 (c)(1),
(2), (4) Date: Oct. 12, 2011

(87) PCT Pub. No.: WO2010/118822
PCT Pub. Date: Oct. 21, 2010

(65) Prior Publication Data
US 2012/0028103 A1 Feb. 2, 2012

(30) Foreign Application Priority Data

Apr. 17, 2009 (DE) .................. 10 2009 017 542

(51) Int. Cl.
*H01M 2/16* (2006.01)
(52) U.S. Cl.
CPC ......... *H01M 2/1646* (2013.01); *H01M 2/162* (2013.01); *H01M 2/1653* (2013.01); *H01M 2/1666* (2013.01)
(58) Field of Classification Search
CPC .. H01M 2/1646; H01M 2/1666; H01M 2/162; H01M 2/1653
See application file for complete search history.

(56) References Cited

U.S. PATENT DOCUMENTS

| 6,200,706 | B1* | 3/2001 | Ashida | D04H 1/54 |
| | | | | 429/247 |
| 6,287,720 | B1* | 9/2001 | Yamashita | H01M 2/14 |
| | | | | 29/623.5 |
| 2002/0102456 | A1* | 8/2002 | Aihara et al. | 429/144 |
| 2003/0180623 | A1 | 9/2003 | Yun et al. | |
| 2004/0241531 | A1 | 12/2004 | Biegert et al. | |
| 2005/0014063 | A1* | 1/2005 | Shi et al. | 429/144 |
| 2005/0221172 | A1 | 10/2005 | Kato et al. | |
| 2006/0281006 | A1* | 12/2006 | Fujino et al. | 429/246 |
| 2007/0111094 | A1* | 5/2007 | Thackeray | H01M 4/38 |
| | | | | 429/218.1 |

(Continued)

FOREIGN PATENT DOCUMENTS

DE 10145875 A1 4/2003
DE 102005042215 A1 3/2007

(Continued)

OTHER PUBLICATIONS

European Patent Office, International Search Report in International Patent Application No. PCT/EP2010/001979 (dated Jun. 28, 2010).

*Primary Examiner* — Eugenia Wang
(74) *Attorney, Agent, or Firm* — Leydig, Voit & Mayer, Ltd.

(57) ABSTRACT

A separator for a battery includes a base having an anode side configured to contact an anode of the battery and a cathode side configured to contact a cathode of the battery. The anode side has a different material consistency than the cathode side.

13 Claims, 3 Drawing Sheets

(56) References Cited

U.S. PATENT DOCUMENTS

| | | | |
|---|---|---|---|
| 2007/0264569 A1* | 11/2007 | Han et al. | 429/213 |
| 2007/0287062 A1* | 12/2007 | Tsukuda | H01G 9/02 |
| | | | 429/129 |
| 2008/0070107 A1* | 3/2008 | Kasamatsu et al. | 429/144 |
| 2008/0096110 A1* | 4/2008 | Bito | H01M 4/131 |
| | | | 429/220 |
| 2009/0029261 A1* | 1/2009 | Thomas-Alyea | H01M 2/166 |
| | | | 429/248 |
| 2009/0246613 A1* | 10/2009 | Park et al. | 429/145 |
| 2009/0325058 A1 | 12/2009 | Katayama et al. | |
| 2010/0055554 A1* | 3/2010 | Makidera | H01M 4/364 |
| | | | 429/144 |
| 2010/0196688 A1 | 8/2010 | Kritzer et al. | |
| 2010/0206804 A1 | 8/2010 | Weber et al. | |
| 2010/0279173 A1 | 11/2010 | Hying et al. | |
| 2010/0291292 A1 | 11/2010 | Hennige et al. | |
| 2011/0081601 A1 | 4/2011 | Weber et al. | |

FOREIGN PATENT DOCUMENTS

| | | | | |
|---|---|---|---|---|
| WO | WO 02061874 A1 | 8/2002 | | |
| WO | WO 2004021499 A2 | 3/2004 | | |
| WO | WO-2007008644 A2 * | 1/2007 | | H01M 2/1653 |
| WO | WO 2007028662 A1 * | 3/2007 | | |
| WO | WO2008062895 A1 * | 5/2008 | | |
| WO | WO 2008108583 A1 * | 9/2008 | | |
| WO | WO 2008143005 A1 | 11/2008 | | |
| WO | WO 200903627 A1 | 3/2009 | | |
| WO | WO 2009033514 A1 | 3/2009 | | |
| WO | WO 2009103537 A1 | 8/2009 | | |

* cited by examiner

ASYMMETRICAL SEPARATOR

CROSS REFERENCE TO RELATED APPLICATIONS

This application is a U.S. National Phase application under 35 U.S.C. § 371 of International Application No. PCT/EP2010/001979, filed on Mar. 29, 2010, and claims benefit to German Patent Application No. DE 10 2009 017 542.3, filed on Apr. 17, 2009. The International Application was published in German on Oct. 21, 2010 as WO 2010/118822 A1 under PCT Article 21 (2).

FIELD

The invention relates to a separator to be arranged in a battery, comprising a base, said base having an anode side for contacting the anode of a battery and a cathode side for contacting the cathode of a battery.

BACKGROUND

Separators of the above-mentioned type are described in international patent applications WO 2009/033 514 A1 and WO 2009/003 627 A1. Nonwovens with a particle filling are described there, which are used as separators in batteries and energy storage devices.

Within the scope of the growing scarcity of natural resources and the associated costs increases for energy, energy storage devices—especially electric energy storage devices—are becoming more and more important for modern industrialized nations.

For the most part, capacitors and batteries are used as energy storage devices. At the present time, lithium-ion batteries are considered to be particularly promising. These batteries are already being used for mobile applications such as, for example, mobile telephones, camcorders, etc.

When these technologies are transferred to large-volume batteries, which are needed to store large amounts of electric energy, however, scale-up problems occur. A crucial problem here is the warming up and overheating of a battery. In the case of large batteries, the heat generated during charging and discharging processes does not dissipate very well, so that the individual components of the battery are exposed to a high thermal load that has the effect of shortening the service life of the battery. Therefore, higher requirements are made of the reliability, stability and service life of the individual components of a battery in order to avoid an internal short circuit or an explosion of the battery.

In order to ensure the economical use of lithium-ion batteries, in addition to enlarging the batteries, there is also a need to further increase their energy density or power density. In order to meet these requirements, new electrode materials are being developed for the anode as well as for the cathode.

For the cathode, high-voltage cathode materials are used that allow a higher cell voltage in the battery and thus also a higher capacity. The high-voltage cathode materials, especially when the battery is in the charged state, are strongly oxidizing materials that make totally new requirements of the components employed in a battery. On the anode side, the separator is in direct contact with strongly reducing electrode materials.

This gives rise to new requirements for the electrolytes and also for the separator, which is in direct physical contact with the electrodes.

SUMMARY OF THE INVENTION

An aspect of the present invention is to provide a separator that can be used without any problem in lithium-ion batteries and that increases the operational reliability of the lithium-ion batteries.

In an embodiment, the present invention provides a separator for a battery including a base having an anode side configured to contact an anode of the battery and a cathode side configured to contact a cathode of the battery. The anode side has a different material consistency than the cathode side.

BRIEF DESCRIPTION OF THE DRAWINGS

Embodiments of the present invention are described in more detail below with reference to the drawings, in which.

DETAILED DESCRIPTION

Figure 1:
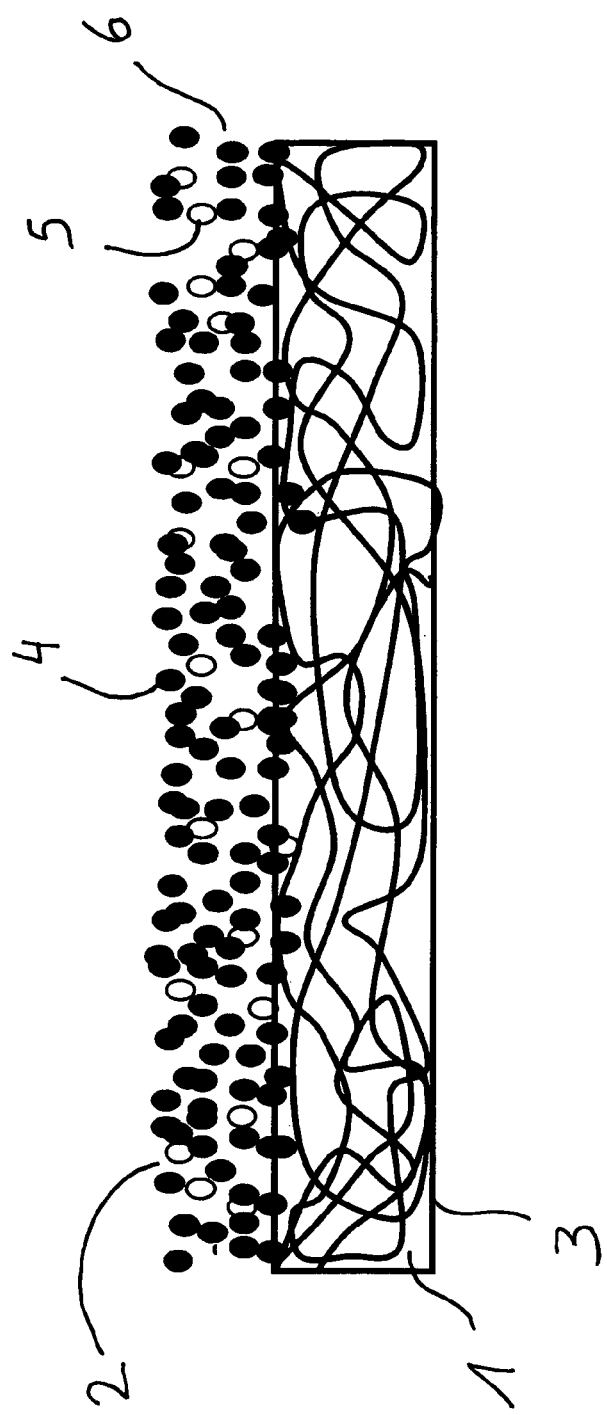
FIG. 1 shows a schematic view of a separator with a base consisting of a nonwoven, whose surface is coated on one side.

According to an embodiment of the invention, it has been recognized that a separator is needed that can come into contact with different electrode materials without any problem. Furthermore, it has been recognized that a different material consistency of the separator on the anode side and on the cathode side makes it possible to adapt the separator to the electrode materials. Here, it is not only conceivable to create a porosity on the anode side that differs from that on the cathode side, but to actually even provide completely different materials or material mixtures. According to the invention, this separator makes it possible to meet the new requirements for large high-energy or high-power batteries. In complete contrast to the prior-art polyolefin separators, which are made of uniform materials (polyethylene or polypropylene) with a pore structure that is isotropic relative to the cross section, the separator according to the invention is structured asymmetrically. Therefore, it can be adapted to each of the different requirements in terms of chemical or electrochemical stability needed on the electrode side in question. In this manner, a more reliable operation of a battery can be ensured.

The different material properties of the separator on the anode side and on the cathode side could also be achieved by a surface treatment, for example, reactive or activating plasma, corona treatment or fluorination. In this manner, especially the adhesion to the electrodes can be improved, a protective layer against electrochemical corrosion can be formed, or the wetting properties can be improved by the electrolyte.

Before this backdrop, the anode side could be made of a first material or of a first material mixture, while the cathode side could consist of a second material or of a second material mixture. The individual materials or material mixtures can be adapted to the chemical or physical conditions on the electrode side in question.

A fine-porous barrier layer could be formed on the anode side and/or on the cathode side. In this manner, dendrite growth can be prevented. Dendrite growth normally starts at the anode and goes from there to the cathode. It can be effectively reduced by a very fine-porous barrier layer. Here, it is also conceivable for very fine pores to be formed on the anode side and for the pore diameter to increase toward the cathode side.

The fine-porous barrier layer could be laminated onto the base. In this manner, a firm and relatively undetachable bond to the base is created. The lamination process allows a separate production of the base and of the barrier layer, which can consist of a material or of a material mixture.

The first material or the first material mixture and/or the second material or the second material mixture could have fillers. The fillers make it possible to set the porosity of the fine-porous barrier layer. Here, it is a possibility to use pulp material, fibers or particles as the fillers. These fillers can even be incorporated into the base in order to modify its porosity.

Before this backdrop, at least some of the fillers could be configured as particles having a mean particle size of 0.2 µm to 10 µm, preferably from 0.5 µm to 4 µm. The particle size of 0.2 µm to 10 µm allows the structuring of a sufficiently fine-porous layer. The particle size of 0.5 µm to 4 µm allows the structuring of a fine-porous layer that effectively prevents dendrite growth in lithium-ion batteries. In this manner, a short circuit or even an explosion of the battery can be avoided. The particles could be round or elongated in shape.

At least some of the fillers on the anode side could be $Al_2O_3$ and at least some of the fillers on the cathode side could contain polyvinylidene fluoride. Surprisingly, particles made of $Al_2O_3$ can withstand the reducing anode materials, and particles of polyvinylidene fluoride can withstand the oxidizing cathode materials. $Al_2O_3$ (aluminum oxide) is reduction-stable, and polyvinylidene fluoride is oxidation-stable.

It is also conceivable to use the particles disclosed in international patent applications WO 2009/033 514 A1, WO 2009/033 627 A1 and in PCT/EP2009/001197, which are incorporated by reference herein, to treat an asymmetrically structured separator, as long as they are reduction-stable or oxidation-stable.

At least some of the fillers could be configured as substances that are swellable and gel-forming in the electrolyte. Due to the swelling or the gel formation, unwanted holes in the separator can be closed and their porosity can be refined even further when they come into contact with the electrolyte.

The fillers listed here, especially the particles, could be bound by binders of the type disclosed in international patent applications WO 2009/033 514 A1, WO 2009/033 627 A1 and in PCT/EP2009/001197.

The base could consist of a nonwoven. A layer of nonwoven can be treated with different materials on the anode side or on the cathode side without any problems. The polyolefin separators known from the state of the art entail considerable disadvantages in terms of their thermal stability. The high shrinkage and the melting and deliquescing at elevated temperatures and pressure should be mentioned in this context. Here, a nonwoven surprisingly exhibits a better behavior although the nonwoven can also comprise fibers made of polyolefins.

Especially preferably, the nonwoven could be configured as a wet-laid nonwoven that is thermally bonded and/or fixed by a binder. Such a nonwoven can be configured especially well with a fine-porous barrier layer.

The nonwoven could be made of fibers whose mean diameter is 5 µm at the maximum. A very fine pore structure is created in this manner.

The melting point of the nonwoven could be higher than 100° C. Preferably, the melting point of the nonwoven could be higher than 140° C. Especially preferably, the melting temperature in the electrolyte could be higher than 200° C. Such a nonwoven is especially well-suited for use in a lithium-ion battery.

The separator could have a maximum shrinkage of 5% at a temperature of 150° C. A separator displaying such a shrinkage behavior can also be used in batteries that have high operating temperatures.

The separator could have a mean pore size (mean pore diameter) of 0.1 µm to 4 µm, preferably from 0.1 µm to 1 µm. At a pore size of 0.1 µm to 4 µm, which is especially present on the anode side, a high lithium-ion concentration and thus a fast charging of the battery are possible. At a pore size of 0.1 µm to 1 µm on the anode side, an especially fast charging of the battery is possible with surprisingly little dendrite growth.

The separator could have a thickness of 40 µm at the maximum, especially preferably 30 µm at the maximum. Even though the coating of an electrode or of a separator increases the reliability of a battery, it does have the drawback that the total thickness of the separator is increased. This detrimentally affects the high energy density and power density of batteries. It has surprisingly been found that, on the one hand, a separator with a maximum thickness of 40 µm brings about sufficient reliability and, on the other hand, results in a high energy density and power density of the lithium-ion battery.

There are various possibilities for configuring and refining the teaching of the present invention in an advantageous manner. In this context, first of all, reference is made to the subordinate claims and, secondly, to the explanation below of preferred embodiments of the invention making reference to the drawing.

In conjunction with the explanation of the preferred embodiments of the invention with reference to the drawing, preferred embodiments and refinements of the teaching are also explained in general.

FIG. 1 shows a separator to be arranged in a battery, comprising a base 1, said base 1 having an anode side 2 for the direct contacting of the anode of a battery, and having a cathode side 3 for the direct contacting of the cathode of a battery. The anode side 2 has a different material consistency from that of the cathode side 3. The base 1 is configured as a nonwoven and, on the anode side, it is coated with a material mixture of inert, temperature-stable particles 4 and binder particles 5. Therefore, the anode side 2 consists of a first material mixture, and the cathode side 3 consists of a second material or of a second material mixture, which is configured here as a nonwoven. A fine-porous barrier layer 6 is formed on the anode side 2.

Figure 2:
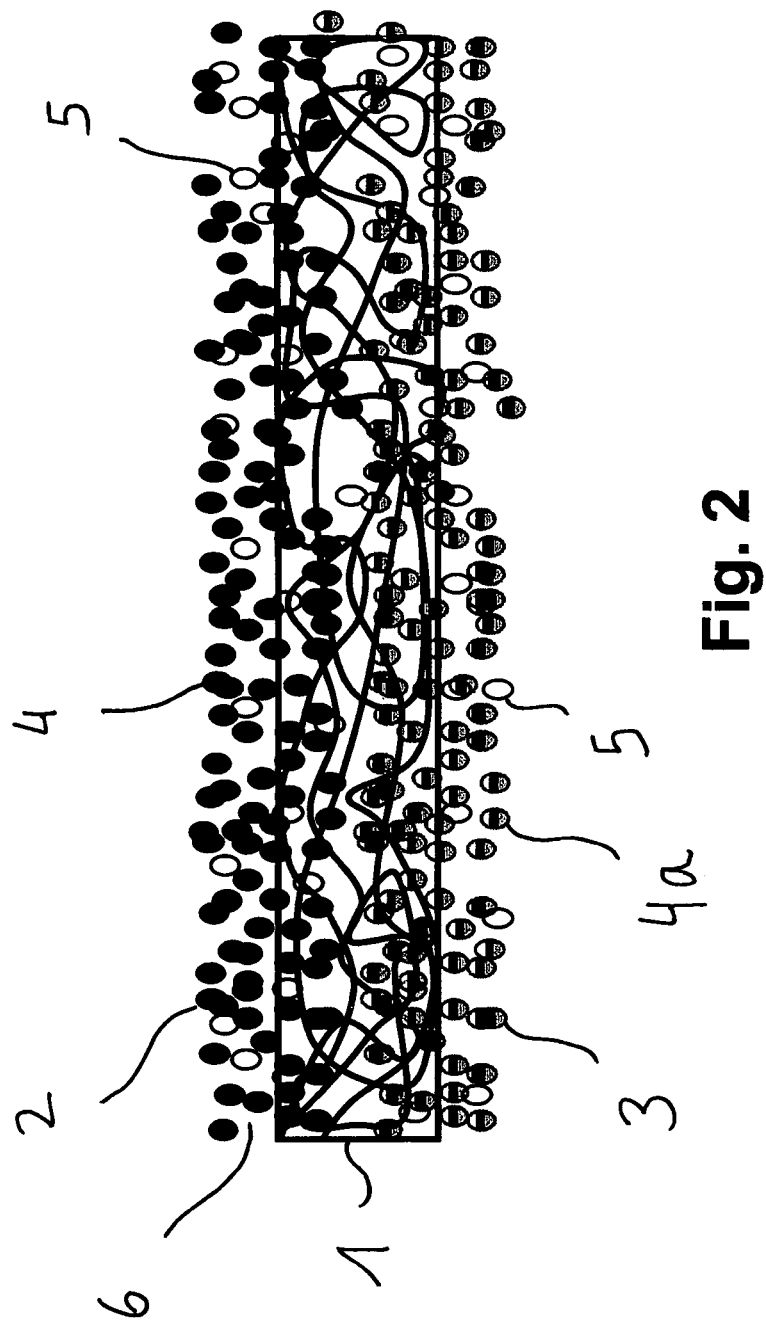
FIG. 2 shows a schematic view of a separator with a base consisting of a nonwoven, whose surface is coated on both sides, and the material mixtures penetrate at least partially into the interior of the base.

FIG. 2 shows a separator to be arranged in a battery, comprising a base 1, said base 1 having an anode side 2 for the direct contacting of the anode of a battery, and having a cathode side 3 for the direct contacting of the cathode of a battery. The anode side 2 has a different material consistency from that of the cathode side 3. The base 1 is configured as a nonwoven and, on the anode side, it is coated with a first material mixture consisting of inert, temperature-stable particles 4 and binder particles 5. On the cathode side, the base 1 is coated with a second material mixture of inert, temperature-stable particles 4a and binder particles 5. Therefore, the anode side 2 consists of a first material mixture, and the cathode side 3 consists of a second material mixture. A fine-porous barrier layer 6 is formed on the anode side 2. The first and second material mixtures have penetrated into the interior of the base 1.

Figure 3:
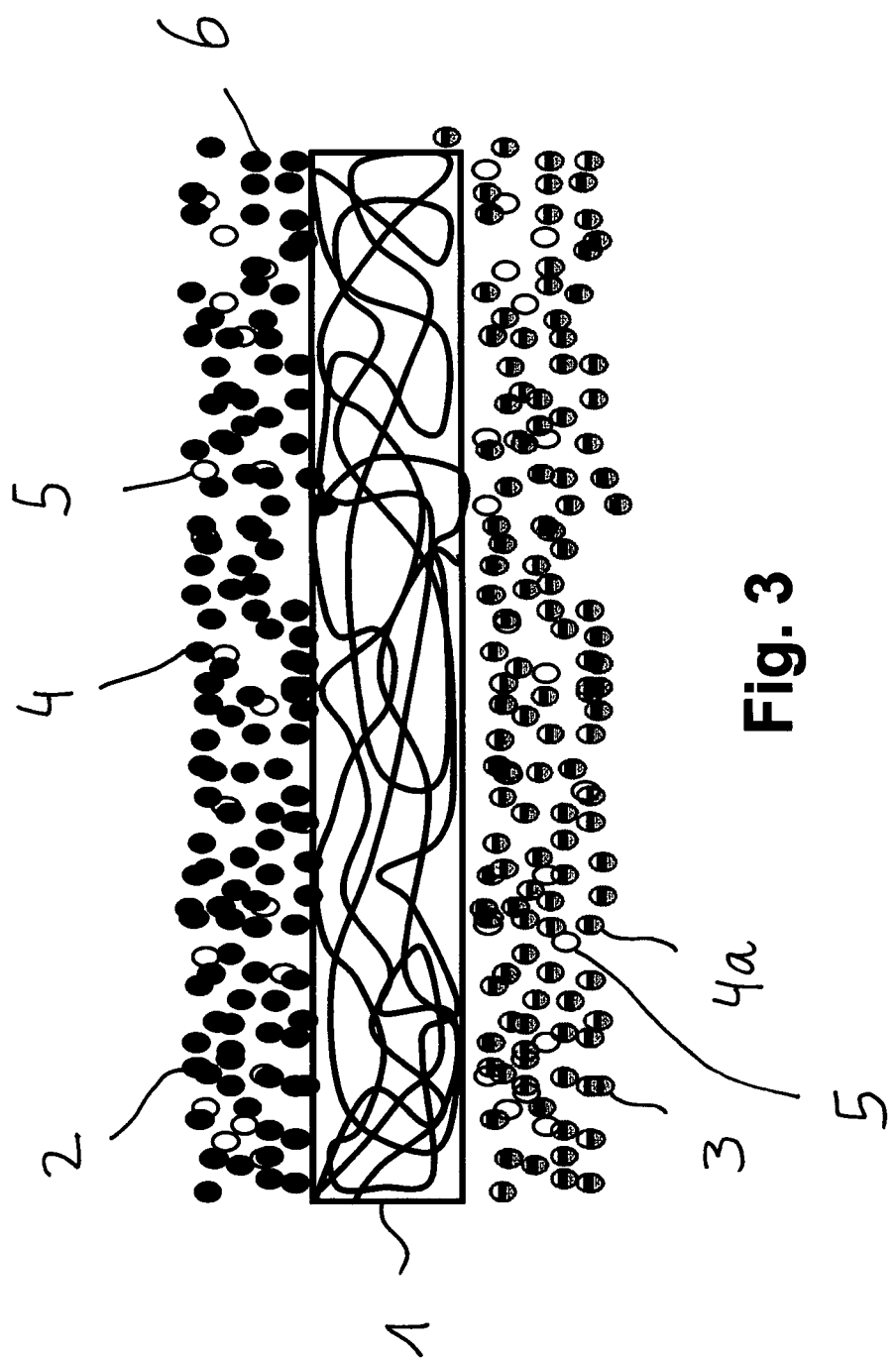
FIG. 3 shows a schematic view of a separator with a base consisting of a nonwoven, whose surface is coated on both sides.

FIG. 3 shows a separator to be arranged in a battery, comprising a base 1, said base 1 having an anode side 2 for the direct contacting of the anode of a battery, and having a cathode side 3 for the direct contacting of the cathode of a battery. The anode side 2 has a different material consistency from that of the cathode side 3. The base 1 is configured as a nonwoven and, on the anode side, it is coated with a first material mixture of inert, temperature-stable particles 4 and binder particles 5. On the cathode side, the base 1 is coated with a 2 material mixture consisting of inert, temperature-stable particles 4a and of binder particles 5. Therefore, the anode side 2 consists of a first material mixture, and the cathode side 3 consists of a second material or of a second material mixture. A fine-porous barrier layer 6 is formed on the anode side 2. The first and second material mixtures have virtually not penetrated into the interior of the base 1.

Exemplary Embodiment

Production of a paste A as the first material mixture on the anode side:
120 parts of a 60% aluminum oxide dispersion ($Al_2O_3$) were added to 180 parts of a 1% CMC (carboxymethyl cellulose) solution and stirred for 30 minutes. Then 8 parts of an aqueous SBR (styrene butadiene rubber) dispersion (65% solids fraction) were added under agitation. The solution was stirred for 1 hour and tested for stability for at least 24 hours. The viscosity of the obtained solution was 120 cP and the pH value was 9.9.

Production of a paste B as the second material mixture on the cathode side:
200 parts of a 2% PVP (polyvinyl pyrrolidone) solution were added to 170 parts of a 57% PVDF (polyvinylidene fluoride) dispersion under constant stirring with a blade paddle agitator. The solution was stirred for 2 hours, de-gassed and tested for stability for at least 24 hours. The viscosity of the obtained solution was 140 cP and the pH value was 7.1.

Coating with Paste A:
A 15 cm-wide PET (polyethylene terephthalate) nonwoven (thickness: 20 μm, weight per unit area: 11.3 $g/m^2$) was continuously coated with the above-mentioned solution by means of a roller-coating process and dried at 120° C.

A coated nonwoven (C) having a weight per unit area of 23.6 $g/m^2$ and a thickness of 29 μm was obtained. The mean pore size was 0.22 μm.

Coating of (C) with Paste B:
The impregnated nonwoven (C) was continuously coated with paste B by means of a roller-coating process and dried at 120° C.

An anisotropically structured separator (D) having a weight per unit area of 32 $g/m^2$ and a thickness of 38 μm was obtained. The mean pore size was 0.19 μm. The shrinkage (150° C., 10 min.) of the separator (D) coated on both sides amounted to 0.5%.

Measuring Methods:
The mean pore size was determined according to ASTME E 1294 (testing method for the features relating to the pore size of membrane filters, making use of an automatic liquid-porosity measuring device). Three 100×100 mm samples were punched out in order to determine the weight per unit area, the samples were weighed and the measured value was multiplied by 100. The thicknesses were measured with a precision thickness measuring device, a 2000 rpm electric model. The measuring surface was 2 $cm^2$, and the measuring pressure was 1000 $cN/cm^2$. In order to determine the shrinkage, 100×100 mm samples were punched out and stored for 10 minutes at 150° C. in a laboratory dryer made by the Mathis company. Subsequently, the shrinkage of the samples was ascertained.

Pertaining to other advantageous embodiments and refinements of the teaching according to the invention, reference is made to the general part of the description on the one hand and to the claims on the other hand.

While the invention has been particularly shown and described with reference to preferred embodiments thereof, it will be understood by those skilled in the art that various changes in form and details may be made therein without departing from the spirit and scope of the invention.

What is claimed is:

1. An asymmetric separator comprising:
a base having two sides, wherein each side independently contacts an electrode of a battery, wherein the base comprises a nonwoven, wherein the base is coated on one of the two sides with a first material mixture and is coated on another of the two sides with a second material mixture,
wherein the two coated sides have a different material consistency and the first material mixture and the second material mixture at least partially penetrate into the nonwoven,
wherein the first material mixture comprises $Al_2O_3$ particles configured to set a porosity of the side coated with the first material mixture,
wherein the second material mixture comprises polyvinylidene fluoride particles having a mean particle size in a range from 0.2 μm to 10 μm and binder particles,
wherein the polyvinylidene fluoride particles are configured to set a porosity of the side coated with the second material mixture,
wherein at least a portion of the polyvinylidene fluoride particles is disposed on an outer surface of the side coated with the second material mixture so as to enable direct contact with the electrode in contact with the side coated with the second material mixture,
wherein the polyvinylidene fluoride particles are bound to the nonwoven using the binder particles,
wherein the nonwoven has a melting point higher than 140° C., and
wherein the separator has a maximum shrinkage of 5% at a temperature of 150° C.

2. The asymmetric separator recited in claim 1, wherein the polyvinylidene fluoride particles provide a fine-porous barrier layer in contact with at least one of the two sides.

3. The asymmetric separator recited in claim 2, wherein the fine-porous barrier layer is laminated on the base.

4. The asymmetric separator recited in claim 1, wherein the $Al_2O_3$ particles have a mean particle size in a range from 0.2 μm to 10 μm.

5. The asymmetric separator recited in claim 1, wherein the polyvinylidene fluoride particles have a mean particle size in a range from 0.5 μm to 4 μm.

6. The asymmetric separator recited in claim 1, wherein at least one of the first material mixture and the second material mixture includes a substance that is swellable and configured to form a gel in an electrolyte of the battery.

7. The asymmetric separator recited in claim 1, wherein the nonwoven is a wet-laid nonwoven that is at least one of thermally bonded and fixed by the binder.

8. The asymmetric separator recited in claim 1, wherein the nonwoven includes fibers having a mean diameter that is no more than 5 μm.

9. The asymmetric separator recited in claim 1, wherein the nonwoven has a melting point higher than 200° C.

10. The asymmetric separator recited in claim 1, wherein the separator has a mean pore size in a range from 0.1 μm to 4 μm.

11. The asymmetric separator recited in claim 1, wherein the separator has a mean pore size is in a range from 0.1 μm to 1 μm.

12. The asymmetric separator recited in claim 1, wherein the separator has a thickness of no more than 40 μm.

13. The asymmetric separator recited in claim 12, wherein the separator has a thickness of no more than 30 μm.

* * * * *